(12) United States Patent
Behruzi et al.

(10) Patent No.: US 8,048,211 B2
(45) Date of Patent: Nov. 1, 2011

(54) TANK WITH A GAS EXTRACTION DEVICE FOR STORING CRYOGENIC LIQUID OR FUEL FOR SPACECRAFT

(75) Inventors: Kei Philipp Behruzi, Bremen (DE); Gaston Netter, Vollersode (DE)

(73) Assignee: Astrium GmbH, Ottobrunn (DE)

( * ) Notice: Subject to any disclaimer, the term of this patent is extended or adjusted under 35 U.S.C. 154(b) by 323 days.

(21) Appl. No.: 12/012,640

(22) Filed: Feb. 4, 2008

(65) Prior Publication Data

US 2008/0237099 A1     Oct. 2, 2008

(30) Foreign Application Priority Data

Feb. 3, 2007   (DE) .................. 10 2007 005 539

(51) Int. Cl.
*B01D 19/00*   (2006.01)
(52) U.S. Cl. ............ 96/190; 55/444; 220/745; 220/747; 220/749
(58) Field of Classification Search ............ 96/188, 96/189, 190; 55/443, 444; 220/745, 746, 220/747, 749; 137/154, 590
See application file for complete search history.

(56) References Cited

U.S. PATENT DOCUMENTS

| | | |
|---|---|---|
| 2,107,390 A | 2/1938 | Rosmait |
| 2,163,988 A | 6/1939 | Stacey |
| 2,519,393 A | 8/1950 | Noyes |
| 2,711,756 A | 6/1955 | Peck et al. |
| 2,732,071 A | 1/1956 | Crow |
| 2,884,937 A | 5/1959 | Myers, Jr. |
| 2,943,815 A | 7/1960 | Besson |
| 3,020,950 A | 2/1962 | Schraivogel |
| 3,084,472 A | 4/1963 | Feik |
| 3,180,084 A | 4/1965 | Meeks |
| 3,202,160 A | 8/1965 | Barger |
| 3,232,560 A | 2/1966 | Moise et al. |
| 3,234,728 A | 2/1966 | Christian et al. |
| 3,234,853 A | 2/1966 | Aber |
| 3,315,845 A | 4/1967 | Vaiden |
| 3,457,864 A | 7/1969 | Price |
| 3,744,738 A | 7/1973 | Howard |
| 3,782,416 A | 1/1974 | Levin |
| 3,854,905 A | 12/1974 | Balzer et al. |
| 3,933,448 A | 1/1976 | Di Peri |

(Continued)

FOREIGN PATENT DOCUMENTS

CA           683 854           4/1964

(Continued)

*Primary Examiner* — Robert A Hopkins
(74) *Attorney, Agent, or Firm* — W. F. Fasse; W. G. Fasse

(57) ABSTRACT

A tank arrangement includes a tank for storing a liquid such as fuel or oxidizer for operation of a spacecraft and a pressurized driving gas for conveying the liquid out of the tank, and a gas supply and extraction device. The device includes a housing shell and plural outwardly expanding passage bodies providing openings that communicate the interior space of the tank to the inner reservoir space of the device. A baffle plate shields the outer opening of each passage body. Deflector plates are arranged in each passage body. Capillary plates extend longitudinally along the inner wall of the housing shell. By a capillary effect, the plates separate liquid from gas entering the device, so that the gas can be extracted while the liquid is stored in a reservoir of the device until it is drained back into the tank during an accelerated operation phase of the spacecraft.

24 Claims, 6 Drawing Sheets

U.S. PATENT DOCUMENTS

| | | | |
|---|---|---|---|
| 4,027,494 A | 6/1977 | Fletcher et al. |
| 4,168,718 A | 9/1979 | Hess et al. |
| 4,253,490 A | 3/1981 | Hansel |
| 4,272,257 A | 6/1981 | Ellion et al. |
| 4,394,966 A | 7/1983 | Snyder et al. |
| 4,399,831 A | 8/1983 | Robert |
| 4,435,196 A | 3/1984 | Pielkenrood |
| 4,489,745 A | 12/1984 | Netter et al. |
| 4,617,031 A | 10/1986 | Suh et al. |
| 4,709,723 A | 12/1987 | Sidaway et al. |
| 4,733,531 A | 3/1988 | Grove |
| 4,743,278 A | 5/1988 | Yeh |
| 4,768,541 A | 9/1988 | Uney et al. |
| 4,790,350 A | 12/1988 | Arnold |
| 4,844,276 A | 7/1989 | Kunze et al. |
| 4,848,987 A | 7/1989 | Howard et al. |
| 4,898,030 A | 2/1990 | Yeh |
| 4,901,762 A | 2/1990 | Miller, Jr. et al. |
| 4,976,398 A | 12/1990 | Bruhn |
| 5,071,093 A | 12/1991 | Perdu |
| 5,209,115 A | 5/1993 | Bond |
| 5,240,038 A | 8/1993 | Canedi |
| 5,263,329 A | 11/1993 | Grove et al. |
| 5,279,323 A | 1/1994 | Grove et al. |
| 5,293,895 A | 3/1994 | Grove et al. |
| 5,441,219 A | 8/1995 | Rauscher, Jr. |
| 5,449,029 A * | 9/1995 | Harris ............ 141/198 |
| 5,901,557 A | 5/1999 | Grayson |
| 6,003,534 A | 12/1999 | Gould et al. |
| 6,014,987 A | 1/2000 | List et al. |
| 6,298,868 B1 | 10/2001 | Dean et al. |
| 6,536,468 B1 | 3/2003 | Wilmer et al. |
| 6,745,983 B2 | 6/2004 | Taylor |
| 7,077,885 B2 | 7/2006 | Charlat |
| 7,395,832 B2 | 7/2008 | Behruzi et al. |
| 2007/0145194 A1 | 6/2007 | Behruzi et al. |
| 2008/0237099 A1 | 10/2008 | Behruzi et al. |
| 2009/0134170 A1 | 5/2009 | Behruzi et al. |
| 2009/0293729 A1 | 12/2009 | Behruzi et al. |

FOREIGN PATENT DOCUMENTS

| | | |
|---|---|---|
| DE | 100 40 755 | 3/2002 |
| DE | 101 17 557 | 10/2002 |
| EP | 0 476 720 | 3/1992 |
| GB | 2 109 760 | 6/1983 |

* cited by examiner

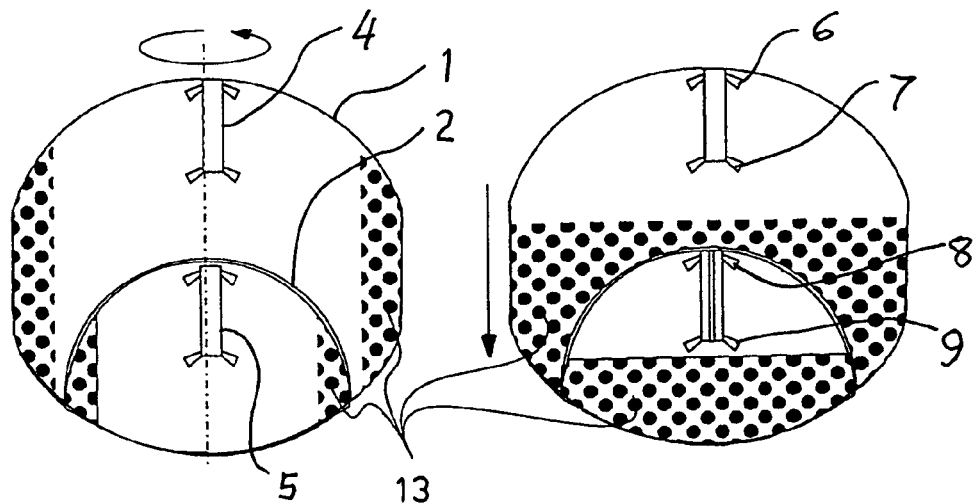
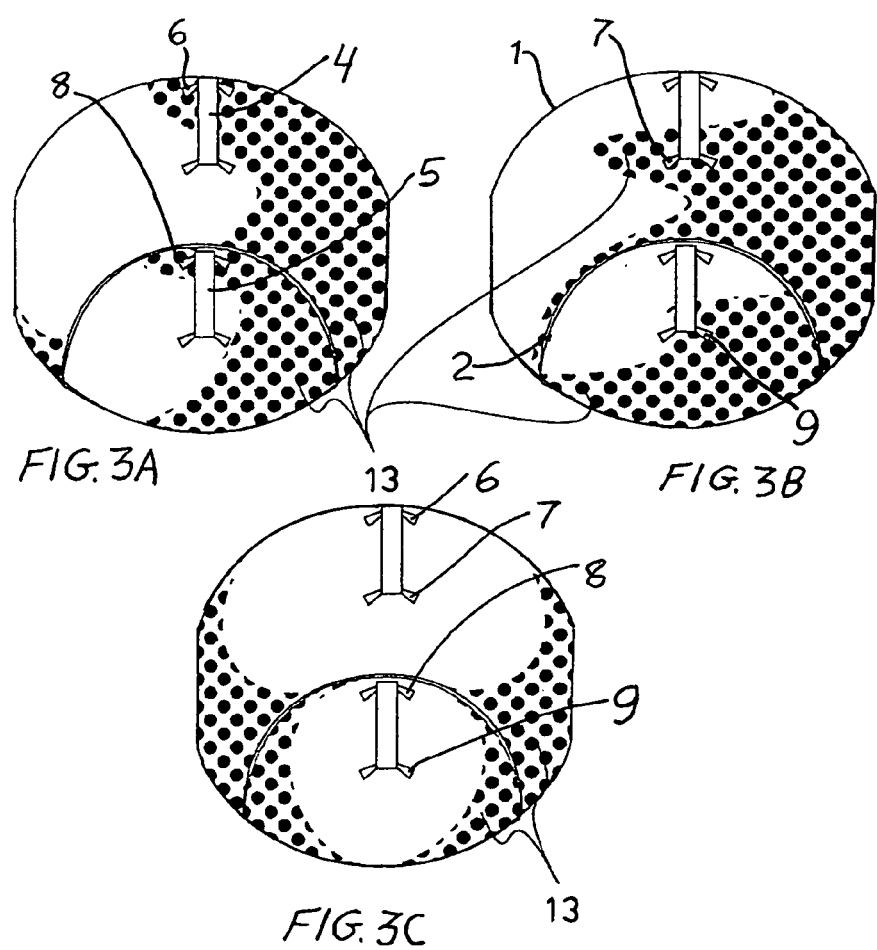

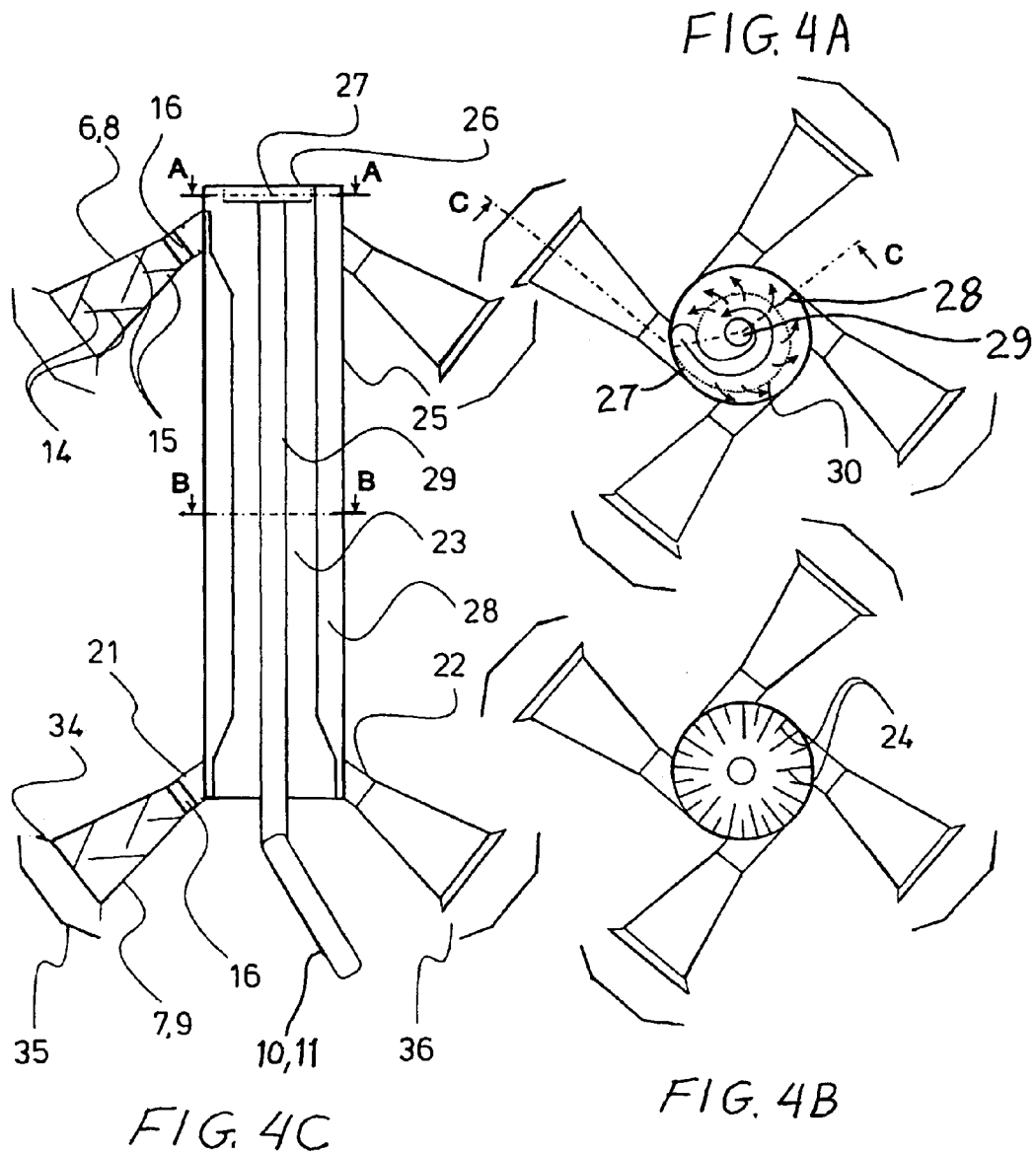

TANK WITH A GAS EXTRACTION DEVICE FOR STORING CRYOGENIC LIQUID OR FUEL FOR SPACECRAFT

CROSS-REFERENCE TO RELATED APPLICATION

This application is related to U.S. application Ser. No. 12/455,160 filed on May 29, 2009 by the same inventors as the present application.

PRIORITY CLAIM

This application is based on and claims the priority under 35 U.S.C. §119 of German Patent Application 10 2007 005 539.2, filed on Feb. 3, 2007, the entire disclosure of which is incorporated herein by reference.

FIELD OF THE INVENTION

The invention relates to a tank for storing cryogenic liquid or fuel for the operation of spacecraft, wherein a pressurized driving gas serves to drive the liquid or fuel out of the tank, and wherein the tank is fitted with an extraction device that uses surface tension to separate the driving gas from the liquid.

BACKGROUND INFORMATION

Tanks of the above mentioned type are used for storing liquid components, for example a liquid fuel on the one hand and a liquid oxidizer on the other hand, for operating a spacecraft.

A pressurized driving gas is introduced into the tanks to convey or drive the liquid components out of the tanks to the combustion chamber or reaction chamber of the spacecraft in which the fuel and oxidizer will be consumed. Inert gases such as helium (He) or nitrogen ($N_2$) are typically used as driving gases, for which purpose they are introduced under pressure into the fuel tank or the oxidizer tank and thereby press the fuel or the oxidizer into the pipeline system leading from the respective tank to the connected rocket engine. In that regard it is important to achieve a complete, reliable and sure separation between the driving gas used as a conveying medium and the liquid fuel or oxidizer being supplied into the engine, because the liquid fuel and oxidizer must absolutely surely be free of foreign gas inclusions when they are supplied to the engine in order to avoid combustion problems.

When a cryogenic liquid, especially liquid hydrogen, is stored in a tank, the warming of the liquid, e.g. the liquid fuel, over time generally leads to a pressure increase in the tank due to the boiling or vaporizing effect of the cryogenic liquid becoming a gas. The resulting over-pressure must be vented out of the tank upon reaching an upper pressure limit value in order to maintain the structural integrity of the tank. This problematic situation especially arises in cryogenic liquid storage systems for space travel vehicles that must operate over a long time span in orbit in a weightless condition. Over such long time spans, the cryogenic liquids, e.g. fuel and oxidizer, warm up and transition to a gaseous state as described above. In such orbital spacecraft, the gas in the tank is then often used for position or attitude regulation of the spacecraft. Namely, the cold gas is vented out of the fuel or oxidizer tank and is ejected in a purposefully directed manner through one or more thrust nozzles into the vacuum of space, so as to impart the appropriate positioning or orienting thrust to the spacecraft. Such a system saves costs, complexity, and weight in comparison to the provision of an additional propulsion system for the position and attitude adjustment, and represents a completely adequate variant for thrust generation.

During this process of controlled venting of the tank to generate thrust for position or attitude regulation, if a gas-liquid mixture is extracted from the tank and ejected into the vacuum of space, then the varying densities of the ejected stream of liquid and gas would lead to a varying non-constant thrust profile depending on the mixing ratio. Thus, the regulating algorithm of the thruster system of the spacecraft would then have to correct for these changes or variations of the thrust in view of the mission requirements. Moreover, the ejection of liquid out of the gas extraction arrangement is undesirable insofar as the liquid fuel is then no longer available for fueling the main rocket engine of the spacecraft.

For surely separating the gas and liquid phases in the above context, it has previously been known to carry out the following separation methods in the field of space travel. According to one known method, the mixture of gas and liquid fuel extracted from the tank is heated sufficiently to ensure that any liquid emitted from the fuel tank is vaporized into the gaseous state. Thereby, it is ensured that only gas is supplied to the thruster nozzles. However, this method requires a high amount of energy for vaporizing the liquid fuel. According to a second method, an additional acceleration is imparted to the spacecraft and thus the fuel tank, so that at the time point of the pressure venting of the tank, the liquid fuel is not located at the gas venting outlet. This method, however, requires an active directed acceleration of the spacecraft by means of an additional propulsion system, which is generally relatively costly and complicates the operation of the spacecraft. Additionally, it is then necessary to adapt the mission profile before carrying out a pressure venting of the tank.

Furthermore it has become known from U.S. Pat. No. 4,027,494 to use phase separators for separating the liquid from the gaseous phase. In this known apparatus a phase separator is used for separating phases under small or minimal acceleration, whereby the separation is carried out by using superconducting magnets. U.S. Pat. No. 4,848,987 further discloses a phase separator that uses pumps and a series of active valves for achieving the phase separation. Still further, U.S. Pat. No. 7,077,885 discloses a phase separator that uses a propeller to set a liquid-gas mixture into rotation, and that comprises a membrane of polyethylene or nylon to separate the liquid, in this case water. This known system is provided for use in connection with fuel cells and is not suitable for separation of cryogenic liquids from gases. Further apparatuses known from U.S. Pat. No. 4,435,196 and U.S. Pat. No. 4,617,031 are limited to use in the gravitational field of earth, and are thus not suitable for separating cryogenic liquids from gases in tanks in spacecraft.

SUMMARY OF THE INVENTION

In view of the above it is an object of the invention to provide a tank arrangement of the above discussed general type that achieves a sure and reliable phase separation of gases from cryogenic as well as non-cryogenic fuels and other liquids at various different acceleration conditions ranging from weightless conditions and low acceleration conditions during ballistic flight phases of a spacecraft up to high acceleration conditions during the main thrust phases as they arise in a space flight system. The invention further aims to provide a simpler, more robust and more economical gas extraction device for such a tank arrangement than the prior art. The invention still further aims to avoid or overcome the disadvantages of the prior art and to achieve additional advantages, as apparent from the present specification. The attainment of these objects is, however, not a required limitation of the claimed invention.

The above objects have been achieved according to the invention in a tank arrangement for storing cryogenic or non-cryogenic liquids such as storable fuels for the operation of spacecraft, and a pressurized driving gas serving as a conveying medium for driving the liquid out of the tank. The arrangement further includes at least one gas supply and extraction device comprising a refillable reservoir that is arranged in the tank and that uses baffles or capillary plates and screens or sieves under the effect of surface tension to separate the gas from the liquid. Particularly according to the invention in such a tank arrangement, the gas supply and extraction device is arranged in the upper portion of the tank, for example in the upper half of the tank, and includes a housing shell that is preferably essentially cylindrical. The gas extraction device further includes a plurality of passage bodies that are arranged on the circumference of the housing shell and that provide respective passage openings which expand so that the openings enlarge outwardly away from the device toward the interior of the tank. The passage bodies providing the expanding openings are thus preferably trumpet shaped. The device further includes an extraction or withdrawal pipe that leads from the inside of the housing shell out from the tank to at least one gas consumer, e.g. a thruster nozzle, of the spacecraft. The passage bodies providing the expanding openings are each respectively equipped with plates, preferably metal plates, that protrude into the opening from the inner wall of the passage body successively on opposite alternating sides of the passage body. The opening of each passage body communicates through a double screen or sieve sleeve with the interior of the device housing. Furthermore, capillary plates extending parallel to the longitudinal axis of the housing are arranged on the inner wall of the device housing shell. The housing shell, the passage bodies and the various different plates are preferably made of metal, but other materials such as fiber reinforced composites are also suitable depending on the particular application.

The penetration of liquids into the opening of the trumpet-shaped passage body is substantially prevented by the arrangement of successive capillary plates protruding alternately from opposite sides of the passage body inner wall into the opening of the passage body. The double screen sleeve and a further wetting barrier leading from the passage body into the interior of the device housing further serve to block the passage of liquid in a preferred embodiment as will be discussed below. Nonetheless, if liquid does penetrate into the interior of the gas extraction device housing, for example due to larger liquid movements, then the penetrating liquid will be captured and guided away by the capillary plates in the interior of the reservoir and will thereby be separated from the gas.

Thus, the gas extraction device provided in the tank arrangement according to the invention has the advantage, with the installed fixed mechanical capillary plates and screens, that it comprises only passive components, i.e. does not require or use any active components, for example does not comprise any active valves, to carry out the separation of gas from liquid. Therefore, the entire system does not require any additional or separate controller for controlling the gas extraction device, but rather the separation of the gas from the liquid occurs passively by the fixed mechanical components. This is a significant advantage over gas separation systems that use active components and require a specialized control, for example systems that require a pre-acceleration for separating the liquid from the gas, or that achieve a phase separation using active control of valves or using an additional heating and vaporization of the fuel. Therefore, the tank arrangement according to the invention is characterized by a considerably simplified construction, an increased reliability and robustness, and reduced costs, in comparison to active systems, and further ensures the liquid-free extraction and supply of gas out of the tank arrangement during phases of reduced acceleration, such as weightless phases or ballistic flight phases, as well as during accelerated flight phases as they arise in connection with the upper stages of rockets and transfer vehicles in space flight.

In a simple manner, the tank arrangement according to the invention ensures that for a reduction of the tank pressure through releasing the pressurized gas, both in the case of an accelerated flight phase as well as in a weightless condition, only the pressurized driving gas and/or the vapor present in the tank, without any residual liquid, will be extracted and released from the tank. Namely, a reliable separation and extraction of the gas from the liquid is ensured. Furthermore, through the inventive arrangement, a supply of pressurized driving gas inwardly into the tank through the gas supply and extraction device is also possible. If an inert driving gas that is warm relative to the tank temperature is introduced, this will cause a controlled vaporization of any liquid present in the extraction device, which in turn will reduce the required amount of inert driving gas and thereby achieve an additional mass savings. In other words, a smaller amount of driving gas will have to be introduced, because the vapor arising from the vaporized liquid in the extraction device will bring about an additional pressurization of the tank.

BRIEF DESCRIPTION OF THE DRAWINGS

In order that the invention may be clearly understood, an example embodiment thereof will now be described in further detail with reference to the accompanying drawings, wherein:

FIGS. 2A and 2B are two schematic sectional illustrations showing the distribution of liquid in the tank arrangement of FIG. 1 during operation phases with high acceleration;

FIGS. 3A, 3B and 3C are three schematic sectional illustrations showing the distribution of the liquid in the tank arrangement of FIG. 1 during operation phases with low acceleration;

FIG. 4A is a cross-sectional view through the gas extraction device according to FIG. 1 along the section line A-A shown in FIG. 4C;

FIG. 4B is a cross-sectional view through the gas extraction device according to FIG. 1 along the section line B-B shown in FIG. 4C;

FIG. 4C is a longitudinal sectional view through the gas extraction device according to FIG. 1 along the section line C-C shown in FIG. 4A;

DETAILED DESCRIPTION OF A PREFERRED EXAMPLE EMBODIMENT AND THE BEST MODE OF THE INVENTION

Figure 1:
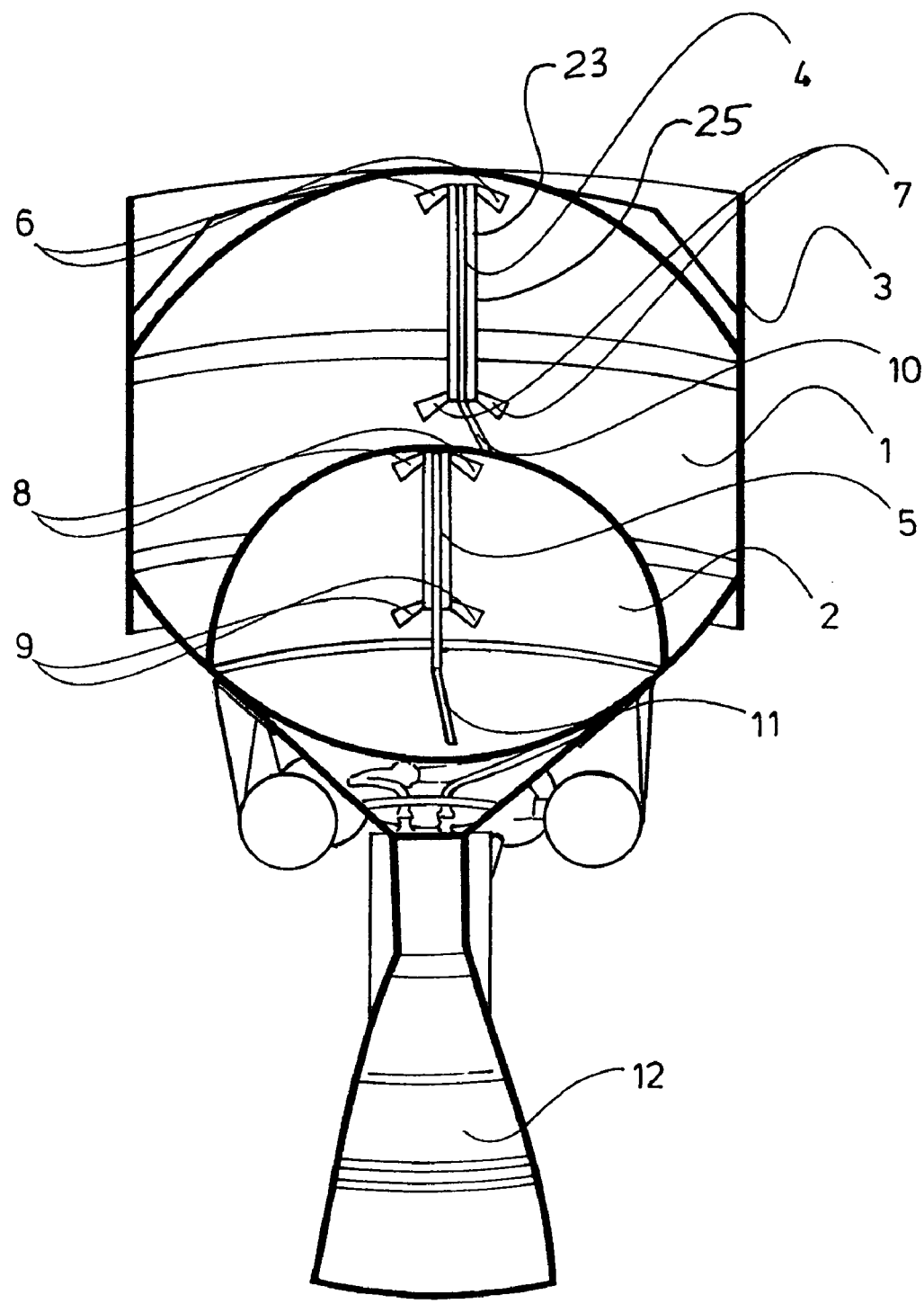
FIG. 1 is a partial sectional view through an upper stage tank arrangement according to the present invention, including respective tanks for liquid hydrogen and liquid oxygen, and gas extraction devices respectively arranged in the tanks.

FIG. 1 shows a tank arrangement including two tanks 1 and 2 that are typically arranged in a rocket upper stage 3 that further has a main rocket engine 12. For example, the tank 1 is for storing a liquid fuel such as monomethylhydrazine (MMH) and/or hydrazine ($N_2H_4$), while the second tank 2 is for storing an oxidizer such as dinitrogentetroxide ($N_2O_4$). Alternatively, the tanks are for storing cryogenic liquids such as liquid hydrogen and liquid oxygen. In this application, a liquid for operation of a spacecraft is understood to include any and all fuels, any and all oxidizers, and any and all other substances that can be stored in a liquid phase and that can be used for any aspect of the operation of a spacecraft.

A respective gas supply and extraction device 4 or 5 is respectively arranged in each one of the two tanks 1 or 2. The gas extraction devices 4 or 5 are generally arranged in the upper portion, for example the upper half, or the upper 40% or the upper 60% of the height or longitudinal dimension of the respective tank 1 or 2. In this regard, the "upper" portion refers to the portion oriented away from the thrust outlet of the main rocket engine 12. The two gas extraction devices 4 and 5 both have the same construction and differ from one another only with regard to the longitudinal length thereof, which is dependent on the respective size and geometry of the respective tank in which the device is installed.

Each gas extraction device 4 or 5 comprises a housing shell 25, which is cylindrical in the present embodiment but may have other configurations. The housing shell 25 encloses an interior reservoir space 23, which communicates with the interior storage space of the respective tank 1 or 2 through several passage bodies 6, 7, 8 and 9 respectively providing open passages or passage openings that expand or enlarge outwardly from the interior reservoir space 23 to the interior storage space of the tank 1 or 2. Thus, the passage bodies 6, 7, 8 and 9 each have preferably an outwardly expanding trumpet-like shape. Each gas supply and extraction device 4 and 5 is further connected by a conduit (e.g. a connector line, pipe, hose, etc.) 10 or 11 to a pipeline system outside of the respective tank 1 or 2 leading to a consumer of the gas, e.g. a thruster nozzle. For improved clarity and simplicity of the drawings, this pipeline system is not shown in detail in the drawings. In this regard, the conduits 10 and 11 pass out of the respective tank 1 or 2 at any desired location depending on the particular construction of the respective tank.

In the present example embodiment, the gas extraction device 4 includes four passage bodies 6 arranged in the top of the tank 1, and four passage bodies 7 arranged approximately in the middle of the height of the tank 1. Similarly, the gas extraction device 5 includes four passage bodies 8 arranged in the top of the tank 2 and four passage bodies 9 arranged approximately in the middle of the height of this tank 2. In this regard, the "top" and the "middle" refer to portions or ranges of the height of the tank, for example the passages bodies 6 or 8 are arranged in the top 20% or the top 10% of the height of the respective tank, while the passage bodies 7 or 9 are arranged in the middle 20% or middle 10% of the height of the respective tank.

Furthermore, the position of the trumpet-shaped passage bodies 6, 7 and 8 and 9 in the respective tank 1 or 2 is optimized depending on the size and geometry of the tank and depending on the amount of fuel and the particular parameters of the various operation phases of the spacecraft, so that at least one of the passage bodies providing a respective opening into the gas extraction device is not completely surrounded by liquid, during substantially all of the various different mission or operating phases. Nonetheless, the inventive system also tolerates, and remains operational with, a short temporary or intermittent covering of all of the passage body openings by liquid. During such a temporary phase, the interior reservoir space of the gas extraction device fills with liquid, while the quantity of gas displaced by this liquid is driven or extracted out of the device.

Such an optimization of the position of the passage bodies 6, 7, 8 and 9 is schematically represented in FIGS. 2A, 2B, 3A, 3B and 3C. Particularly, these figures show where the liquid 13 may be located in the tanks 1 and 2 during various different operation phases.

FIGS. 2A and 2B represent phases with high acceleration. For example this includes phases during which the main rocket engine 12 is ignited and causes a strong linear acceleration, such that the liquid 13 respectively collects in the bottom portion of the two tanks 1 and 2 as shown in FIG. 2B. Another high acceleration phase involves a rotation of the spacecraft and the tanks 1 and 2 as shown in FIG. 2A, whereby the liquid 13 collects at the lateral outer walls and the outer portion of the tanks 1 and 2. In both of these situations shown in FIGS. 2A and 2B, it can be seen that the liquid 13 remains clear away from the gas supply and extraction devices 4 and 5, so that these devices can clearly extract gas from the tanks 1 and 2 without any danger of drawing out the liquid 13. In FIG. 2B it can be seen that the position and height of the gas extraction devices 4 and 5 and especially the passage bodies thereof are designed to remain clear of the liquid 13, depending on the size and geometry of the tanks and the amount of liquid stored in the tanks.

Another mission phase of interest is the starting or launch condition in which the rocket or other spacecraft is located on the ground on earth. In this condition, the tanks 1 and 2 are predominantly filled with liquid so that the gas supply and extraction devices 4 and 5 are also substantially submerged in and filled with liquid. At this time, it is generally not necessary to extract gas out of the tanks. Still the upper trumpet openings 6 and 8 in FIG. 2B are not completely submerged in liquid on ground and before engine ignition such that the tanks can be pressurized or vented at any time. During the first ignition of the main engine 12, the liquid fuel and oxidizer are extracted from the tanks 1 and 2, and correspondingly the liquid is emptied out of the interior reservoir space of the devices 4 and 5. During this phase of the extraction of fuel and oxidizer out of the tanks 1 and 2, a pressurized driving gas is introduced through the gas supply and extraction devices 4 and 5 into the tanks 1 and 2 so as to replace the withdrawn liquid. The reservoir space is appropriately dimensioned so that as soon as the first burn is ended, the openings of the lower passage bodies 7 and 9 of the extraction devices 4 and 5 are clear of, i.e. no longer in contact with, the liquid still remaining in the respective tank 1 or 2. Thus, once the first burn of the rocket engine 12 has finished, the gas extraction system according to the invention is substantially free of liquid.

A further operation or mission phase relates to ballistic flight phases with relatively low acceleration, for example during the deployment of a satellite. In such flight phases, the liquid 13 is distributed variably and randomly in the tank 1 or 2 and undergoes a chaotic motion, whereby the liquid may sporadically cover the openings of the upper passage bodies 6 and 8 of the extraction devices 4 and 5 as shown in FIG. 3A, or sporadically cover the openings of the lower passage bodies 7 and 9 as shown in FIG. 3B, or leave all of the passage bodies uncovered as shown in FIG. 3C.

FIGS. 4A, 4B and 4C are various sectional illustrations of either one of the two gas supply and extraction devices 4 or 5 in the tank arrangement of FIG. 1. As mentioned above, the gas extraction device 4 or 5 comprises a shell forming a housing 25, which is preferably cylindrical in the present embodiment, and which encloses an interior reservoir space 23. The device further comprises a plurality, in the present embodiment eight, passage bodies 6, 7, 8 and 9 forming openings that communicate from the interior of the surrounding tank into the interior reservoir space 23. These openings of the passage bodies 6, 7, 8 and 9 expand or flair outwardly in the manner of a trumpet. A series of plates 14 are arranged on the inner surface of each passage body 6, 7, 8 and 9 so as to protrude inwardly into the open passage. The plates 14 are preferably solid metal plates, but can alternatively be made of a different material or may instead be sieve or screen plates or a perforated plate. The plates 14 are arranged alternately in succession on opposite sides of the inner surface of the respective passage body. Also, the plates are arranged so that they each form a respective acute angle with the respective inner wall of the opening of the passage body 6, 7, 8 or 9, with the vertex of each acute angle pointing inwardly toward the interior reservoir space 23.

Furthermore, a respective baffle plate 35 is arranged in front of the outer mouth or opening of each respective passage body 6, 7, 8 and 9. Each passage body preferably further includes a conically expanding or flared rim 34 facing the baffle plate 35. The baffle plate 35 preferably similarly has a conically flared rim facing and overlapping the conically flared rim 34 of the trumped-shaped passage body. Thereby, the baffle plate 35 ensures that a majority of the liquid in the tank will be deflected away from and flow by the opening of the passage body 6, 7, 8 or 9. Particularly, the baffle plate 35 is arranged and configured so that the gap 36 between the baffle plate 35 and the conically flared rim 34 of the passage body 6, 7, 8 or 9 becomes narrower toward the outer edge of the baffle plate 35 and of the flared rim 34. Due to this configuration, any liquid that penetrates into the gap 36 will be largely retained in the angled area of the baffle plate 35 due to the capillary effects, and will not penetrate farther into the trumpet-shaped throat or opening of the respective passage body 6, 7, 8 or 9.

Any liquid that does penetrate into the respective passage body 6, 7, 8 or 9 will then be predominantly collected, due to the capillary effects, in the acute angled corners 15 formed between the plates 14 and the walls of the passage body 6, 7, 8 or 9. In that regard, the plates are rather narrow so that only comparatively little liquid can collect here.

The throat or neck of each trumpet-shaped passage body 6, 7, 8 and 9 is connected to the housing shell 25 by a respective double screen or sieve sleeve 16 and a pipe wall 22. The construction of the double screen sleeve 16 is shown and will be described in further detail in connection with FIG. 5. Generally, the double screen sleeve 16 further serves to block the passage of any liquid through the throat of the opening of the respective passage body 6, 7, 8 or 9 into the interior reservoir space 23. Still further, after the double screen sleeve 16, a wetting barrier 21 is formed in the pipe wall 22 connecting to the housing shell 25. This wetting barrier 21 may simply be formed by a weld edge, weld bead or weld seam, or alternatively by an annular disc arranged perpendicularly on the inner surface of the pipe wall 22 of the respective passage body 6, 7, 8 or 9. This wetting barrier 21 further serves to block the penetration of any liquid wetting the inner surface of the passage body.

Figure 5:
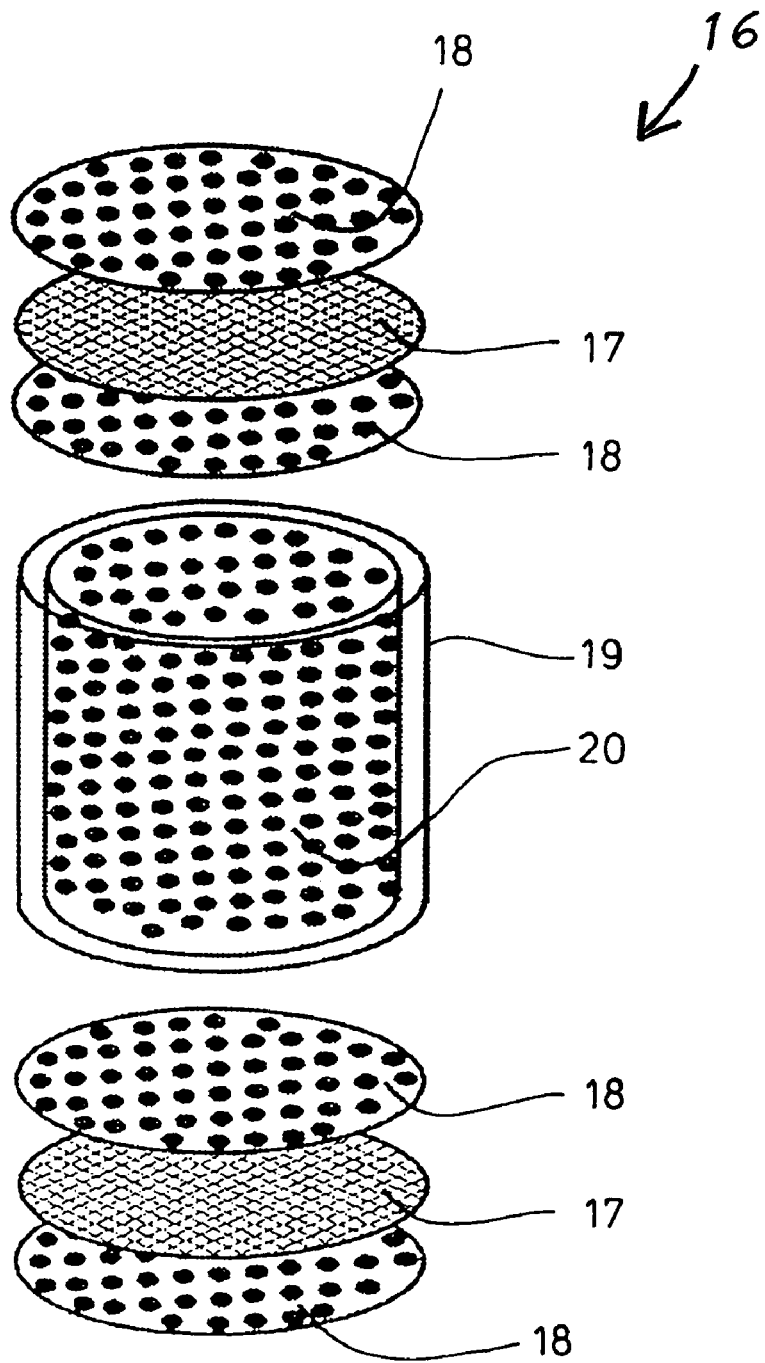
FIG. 5 is a perspective exploded view showing a portion of the device according to FIGS. 4A, 4B and 4C in detail.

The exploded view of the construction of the double screen sleeve 16 shown in FIG. 5 depicts several components making up the double screen sleeve 16. Two screens or sieves 17 are respectively bounded and sandwiched between perforated plates 18, and furthermore two cylindrical sleeves 19 and 20 are arranged concentrically within one another between the two combinations or sandwiches including the screen disc 17 between the perforated plate discs 18. Particularly, the outer cylindrical sleeve 19 is preferably a solid cylindrical sleeve 19, while the inner sleeve is a perforated cylindrical sleeve 20 provided with holes.

If liquid penetrates into the throat area of the opening of one of the passage bodies 6, 7, 8 or 9, the wetting effect of the liquid in the areas between the screens 17 and the perforated plates 18, and between the perforated sleeve 20 and the solid sleeve 19, leads to a complete wetting of the solid body structures of these components and the formation and inclusion or enclosure of a gas bubble in the interior space of the double screen sleeve 16. As a result, the penetration of liquid through or past the double screen sleeve 16 is reduced by the so-called bubble point pressure of the two screens 17. This bubble point pressure is the pressure that the flow must apply in order to break the wetting films and push or remove the gas bubble out of the interior region of the double screen sleeve 16. The penetration of larger quantities of liquid is thereby effectively minimized. In that regard, the necessary bubble point pressure for blocking or preventing the penetration of liquid depends on the flow velocity of the liquid-gas mixture.

As can be seen especially in FIGS. 4A and 4B, the trumpet-shaped passage bodies 6, 7, 8 and 9 are connected to and extend from the housing shell 25 of the respective gas extraction device 4 or 5 in a tangential arrangement or pinwheel pattern. With this tangential pinwheel arrangement, any liquid in the passage bodies 6, 7, 8 and 9 will be radially flung out of the device during a rotating operation phase as depicted in FIG. 2A. Furthermore, the tangential arrangement of the passage bodies 6, 7, 8 and 9 causes a cyclonic rotation of the liquid-gas mixture flowing into the interior reservoir space 23 from the passage bodies 6, 7, 8 and 9. This cyclonic rotation or swirling of the gas and any admixed liquid, in the preferably cylindrical interior reservoir space 23, causes a centrifugal separation of the phases, by centrifugally flinging any liquid outwardly against the inner walls of the cylindrical housing shell 25, or against capillary plates 24 that are arranged extending longitudinally along the inner wall of the housing shell 25 and protruding into the interior reservoir space 23.

As an alternative to the above arrangement and construction, in order to enlarge or increase the volume of the interior reservoir space 23, the interior space 23 may have a different geometric shape or a variable diameter. For example, the housing shell 25 and/or the capillary plates 24 may be configured to enclose a substantially spherical interior space or a quadratic round shape of the interior space instead of a cylindrical shape. Also, the housing shell 25 may have a portion with a locally enlarged diameter.

As mentioned above, the capillary plates 24 provided along the inner surface of the housing shell 25 and protruding into the interior reservoir space 23 serve to capture and guide away any residual amount of liquid that penetrates through the openings of the passage bodies 6, 7, 8 and 9 into the interior reservoir space 23. The capillary plates 24 extend longitudinally along the inner wall of the housing shell 25, and preferably have a variable width as can be seen in FIG. 4C. Namely, the main length portion of each capillary plate 24 has a slightly larger width that tapers to a narrower width portion in the proximity of each opening of each passage body 6, 7, 8 and 9 into the inner reservoir space 23. This tapering and narrowing of the capillary plates 24 in the area of the passage body openings ensures that no significant liquid quantities can accumulate at these locations. Furthermore, to optimize the capillary filling behavior, the capillary plates 24 include narrower plates and wider plates that alternate with one another in a star pattern around the circumference of the housing shell 25 as can be seen in the sectional view of FIG. 4B.

The central area of the interior reservoir space 23 in the housing shell 25 is free of the capillary plates 24, so that preferably only gas without any liquid collects in this central area. Furthermore, each gas supply and extraction device 4 or 5 additionally includes a separation chamber 27 arranged in the upper end 26 of the device located or oriented away from the engine 12. The inner construction of the separation chamber 27 is especially evident in the sectional view of FIG. 4A as taken on the section plane A-A in FIG. 4C. In the separation chamber 27, a screen or sieve element 30 is arranged in a spiral shape, whereby the spiral curvature of the screen element 30 achieves the effect that any remaining liquid mixed in the gas that enters the separation chamber 27 will be deposited on the screen as the mixture flows along and/or through the spiral. One of the capillary plates 24 arranged in the housing shell 25, particularly the capillary plate 28, is longer than the other capillary plates 24, namely is elongated in the longitudinal direction of the device housing so far in the direction toward the separation chamber 27 so that it extends to the outer end of the spiral screen element 30. Thereby, the longer capillary plate 28 serves to collect the last residual liquid that is separated from the gas in the separation chamber 27 and driven out of the chamber 27 by the spiral screen element 30, and then the longer capillary plate 28 serves to return or guide the collected liquid back into the interior reservoir space 23 by capillary action.

Finally, a gas extraction or withdrawal pipe 29 respectively arranged in the center area of each respective gas supply and extraction device 4 or 5 leads from the separation chamber 27 out of the gas extraction device 4 or 5 to the conduit 10 or 11 and thus out of the respective tank 1 or 2. The pipe 29 may be any pipe, hose, duct or the like, and may generally be regarded as a conduit. Thus, the gas that has been separated from the liquid, in the final stage in the separation chamber 27, is conveyed through the pipe 29 and the conduit 10 or 11 out of the tank 1 or 2. Either the pipe 29 can extend longitudinally through the entire interior reservoir space 23 of the gas supply and extraction device as shown in FIG. 4C, or depending on the tank configuration, the pipe 29 can extend out of the gas supply and extraction device 4 or 5 in the opposite direction, i.e. toward the top. In any case, depending on the requirements, each gas extraction or withdrawal pipe 29 can be connected via the respective allocated conduit 10 or 11 with the consumer of the gas, e.g. attitude or position regulation thruster nozzles as discussed above.

Figure 6:
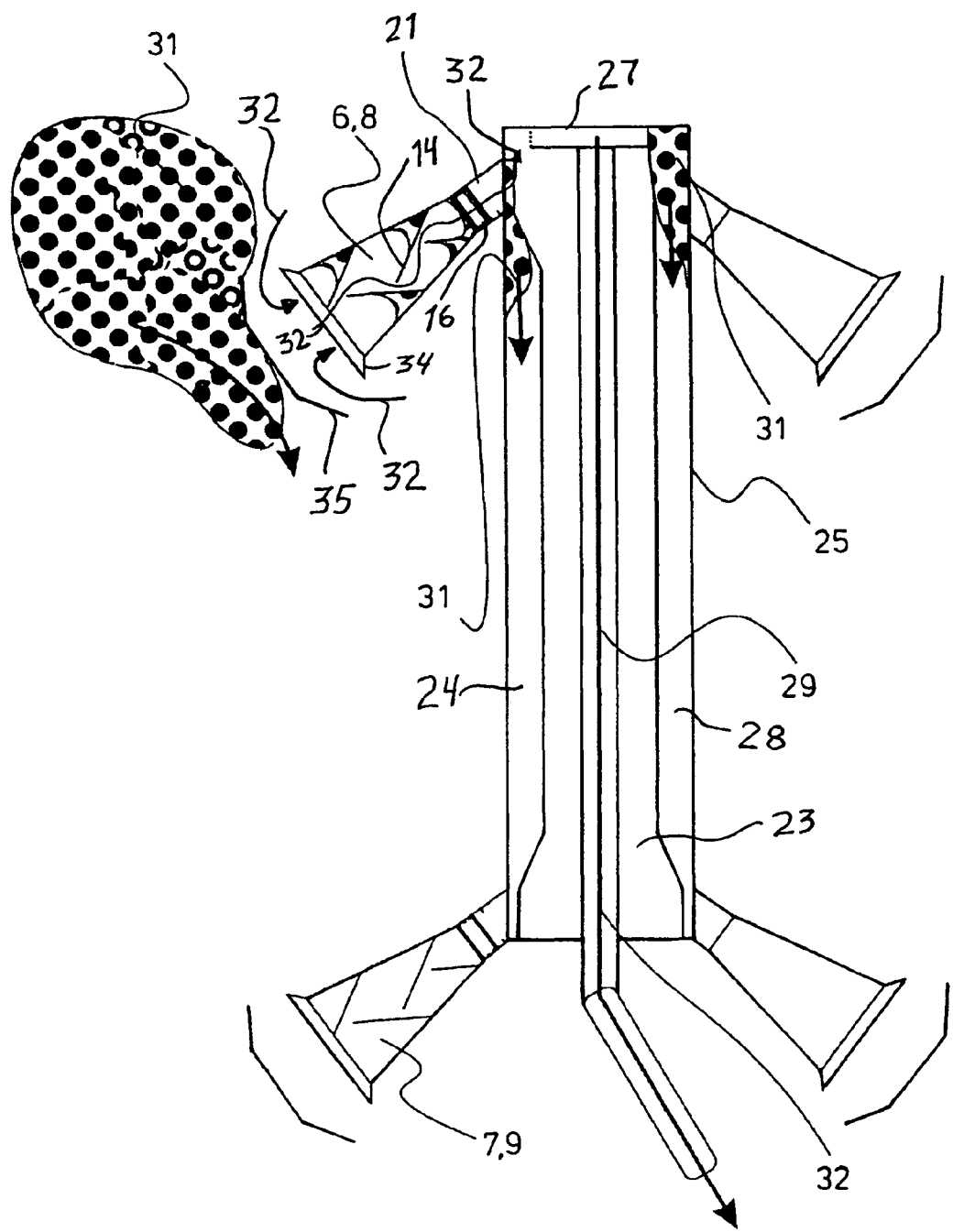
FIG. 6 is a schematic illustration of the multi-stage liquid separation carried out in the device according to FIG. 4C.

As can be understood from the above disclosure, the separation of the liquid and gas phases in the inventive arrangement is achieved largely by capillary effects or surface tension effects at several stages, and does not require active moving parts, an active control, or the application of additional heat energy. FIG. 6 represents a situation in which liquid 31 contained in the respective tank 1 or 2 impinges on one of the passage bodies 6 or 8 of a gas extraction device 4 or 5, so that the liquid 31 must be separated from the gas 32 in order to ensure the extraction of liquid-free gas through the extraction pipe 29. The flow paths of the liquid 31 and gas 32 are illustrated by respective arrows. Summarizing the above disclosure, the separation of the liquid 31 from the gas 32 is achieved at several stages. The first stage involves deflection and capillary shedding or blocking of the liquid 31 by the baffle plate 35 and its interaction with the conical flared rim 34 of the trumpet-shaped passage body 6 or 8. The next stage of separation is achieved by the capillary liquid trapping effect of the plates 14 arranged in the passage body 6 or 8. The next stage of separation is achieved in the double screen sleeve 16. The next stage of separation is achieved by the wetting barrier 21. The next stage of separation is achieved by the wetting and capillary effect of the capillary plates 24, especially together with the collecting effect of the capillary plates 24 due to the rotating cyclonic flow of the gas-liquid mixture induced by the tangential connection of the passage bodies 6 or 8 into the housing shell 25. The next stage of separation is achieved in the spiral screen 30 of the separation chamber 27, which sheds any collected final residue of liquid radially outwardly onto the longitudinally extended capillary plate 28. Thus the collected liquid 31 flows longitudinally downwardly along the capillary plates 24 and 28 into the interior reservoir space 23 of the device 4 or 5. The device ensures a phase separation so long until the area of the capillary plates 24 of the reservoir space 23 is completely filled with liquid 31. Thus, the size of the reservoir space 23 is appropriately designed and dimensioned so that it is sufficient for a low-acceleration ballistic flight phase of the spacecraft as discussed above.

Figure 7:
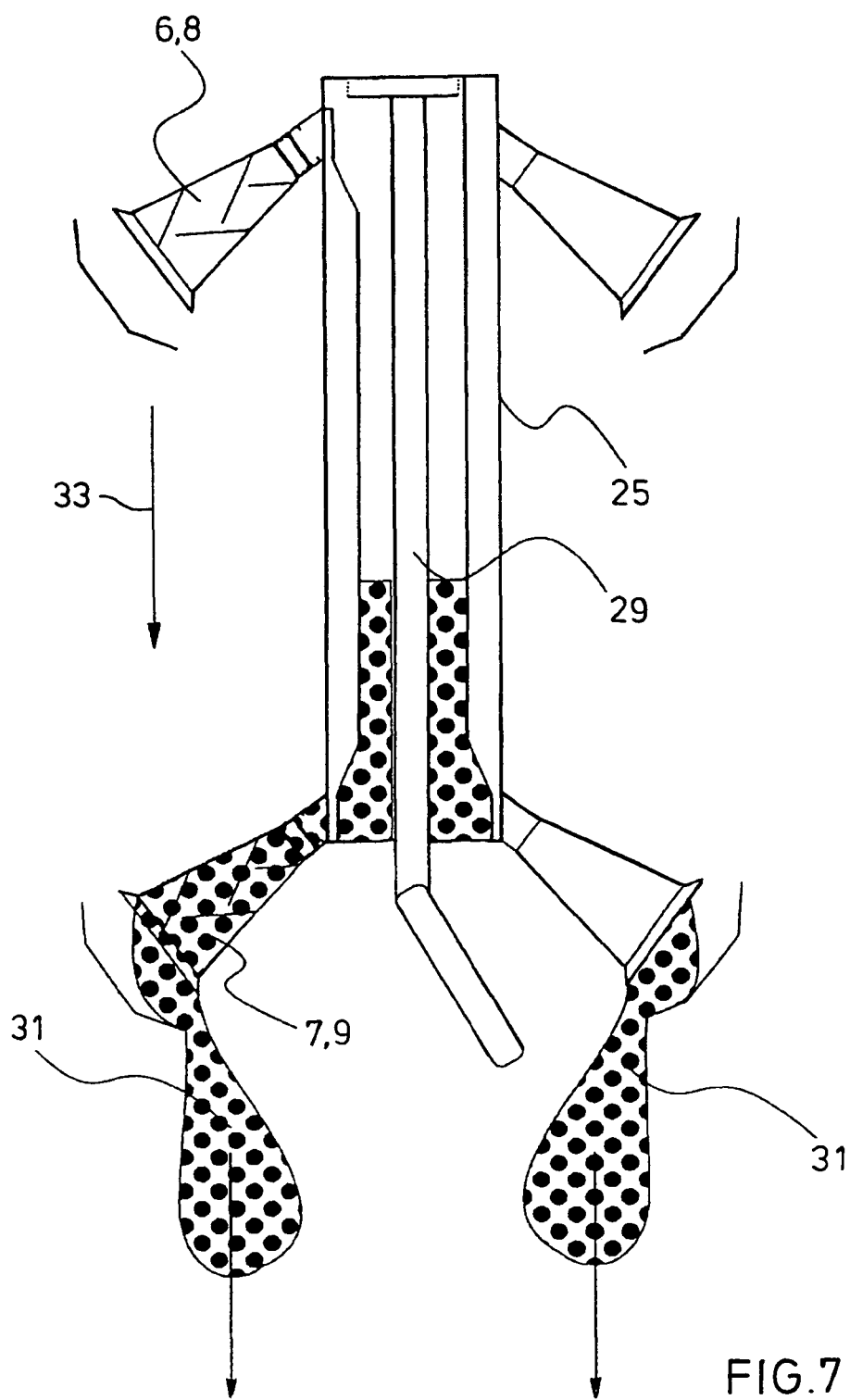
FIG. 7 is a schematic illustration of the process of draining liquid out of the device according to FIG. 4C during an accelerated operating phase.

Once the reservoir space 23 of the device has become at least partially filled, it can again be drained or emptied as schematically shown in FIG. 7. To achieve this, an acceleration is applied to the spacecraft and thus to the tank 1 or 2 and the device 4 or 5 installed therein, to apply an acceleration 33 on the liquid 31 effective in a direction toward the lower or bottom passage bodies 7 and 9 arranged toward the engine 12. The acceleration applied to the spacecraft is opposite the direction of arrow 33. This acceleration drives the liquid 31 relatively into the lower portion of the interior reservoir space 23 and causes it to flow out through the bottom passage bodies 7 or 9. Similarly, any liquid remaining in the upper passage bodies 6 or 8 will also be drained out back into the tank 1 or 2. In this regard, the openings of the passage bodies 6, 7, 8 and 9, and the plates 14 arranged therein are configured and arranged so that they are oriented or tilted obliquely downwardly, so that liquid can flow and drain out. Thereby it is ensured that the reservoir can be completely emptied of liquid during such an acceleration phase of the operation of the spacecraft. Then the device is again ready to carry out a complete effective separation of gas from liquid.

The inventive arrangement thus makes it possible to achieve the liquid-free extraction of the pressurized gas (driving gas and/or gas vaporized from the liquid) in the tank, as well as the supply of inert gas such as helium or nitrogen or returned vapor into the tank for pressurizing the tank. If an inert gas that is warm relative to the temperature of the tank is introduced through the gas supply and extraction device into the tank, then the heating effect will lead to the controlled vaporization of the liquid in the device, which will generate additional pressurizing gas and thus achieve a mass savings (due to a reduced required amount of pressurizing inert gas), without the liquid in the tank itself being affected by the heating vaporization. Such vaporization of the liquid in the tank would be undesirable especially in the proximity of the liquid fuel outlet of the tank.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A tank arrangement for a spacecraft comprising:
   a tank enclosing a tank interior space adapted to contain therein a liquid for operation of the spacecraft and a pressurized driving gas adapted to drive the liquid out of said tank; and
   a gas supply and extraction device that is arranged in said tank interior space and is adapted to separate the gas from the liquid and extract the gas out of said tank, and that comprises:
   a housing shell enclosing therein an interior reservoir space,
   a plurality of passage bodies that are arranged on a perimeter of said housing shell and provide respective open passages communicating through said passage bodies from said tank interior space to said interior reservoir space, wherein said open passages are enlarged with an increasing cross-sectional area toward said tank interior space,
   a respective plurality of plates respectively arranged in each respective one of said passage bodies, wherein said plates protrude into said open passage of said respective passage body alternately in succession from opposite sides of an inner surface of said respective passage body,
   a plurality of elongated plates arranged on an inner surface of said housing shell and extending longitudinally parallel to a longitudinal axis of said housing shell, and
   a gas extraction conduit leading and communicating from said interior reservoir space out of said device and out of said tank.

2. The tank arrangement according to claim 1, wherein said device is arranged in an upper portion of said tank in a direction of thrust of a rocket engine of the spacecraft connected to said tank to be supplied with the liquid.

3. The tank arrangement according to claim 2, wherein said passage bodies are arranged in groups, and wherein a first group of said passage bodies is located in an upper 20% of said tank and a second group of said passage bodies is located in a middle 20% of said tank relative to a height of said tank along the direction of thrust of the rocket engine.

4. The tank arrangement according to claim 3, wherein said second group of said passage bodies is located so as to be above a liquid level of the liquid in said tank at an end of a first burn of the rocket engine.

5. The tank arrangement according to claim 1, wherein said device further comprises plural baffle plates, with a respective one of said baffle plates respectively arranged in front of a respective open end of each respective one of said passage bodies in said tank interior space, and with a respective gap formed between said respective baffle plate and said open end of said respective passage body.

6. The tank arrangement according to claim 5, wherein said baffle plates each respectively have a conically flared rim extending toward said respective open end, and said open ends each respectively have a conically flared rim extending toward said respective baffle plate, so that said gap becomes outwardly narrower to a gap dimension that creates a capillary effect for the liquid.

7. The tank arrangement according to claim 1, wherein each respective one of said passage bodies is trumpet-shaped.

8. The tank arrangement according to claim 1, wherein each one of said plates in a respective one of said passage bodies is arranged to form an acute angle with said inner surface of said respective passage body, and wherein a vertex of said acute angle points inwardly along said open passage toward said interior reservoir space.

9. The tank arrangement according to claim 1, wherein said device further comprises double screen arrangements respectively interposed in said open passages between said interior reservoir space and said plates in said passage bodies.

10. The tank arrangement according to claim 9, wherein each one of said double screen arrangements respectively comprises a first screen plate sandwiched between two first perforated plates, a second screen plate sandwiched between two second perforated plates and spaced apart from said first screen plate, and a cylindrical screen sleeve extending between said first and second screen plates and forming a gas bubble trapping chamber therein.

11. The tank arrangement according to claim 9, wherein said device further comprises wetting barriers respectively interposed between said double screen arrangements and said interior reservoir space.

12. The tank arrangement according to claim 1, wherein said passage bodies join onto and extend from said housing shell substantially tangentially.

13. The tank arrangement according to claim 1, wherein said device further comprises a gas-liquid separation chamber arranged in an end region of said housing shell.

14. The tank arrangement according to claim 13, wherein said separation chamber comprises a spiral-shaped screen element arranged in a chamber, and wherein at least one of said elongated plates extends longitudinally to connect to said separation chamber.

15. The tank arrangement according to claim 14, wherein an end of said gas extraction conduit connects into a center of said separation chamber at a center of said spiral-shaped screen element.

16. The tank arrangement according to claim 1, wherein said elongated plates extend longitudinally along said housing shell entirely between an uppermost group of said passage bodies and a lowermost group of said passage bodies, and wherein said elongated plates each respectively have a relatively narrower width at end portions proximate to said uppermost and lowermost groups of said passage bodies and a relatively wider width at a middle portion between said end portions.

17. The tank arrangement according to claim 1, wherein said elongated plates extend widthwise radially toward said longitudinal axis at a center of said housing shell but do not extend into a central space of said interior reservoir space that is free of said elongated plates.

18. The tank arrangement according to claim 1, wherein said elongated plates include relatively narrower plates and relatively wider plates that are arranged in alternation spaced from one another around a perimeter of said housing shell.

19. The tank arrangement according to claim 1, wherein said housing shell comprises a shell portion with a locally enlarged diameter.

20. The tank arrangement according to claim 1, wherein said device includes only passive fixed components, no active components, no valves, and no controller for separating the gas from the liquid, and achieves the separation of the gas from the liquid entirely by baffling effects, bubble point pressure effects, surface tension effects, capillary effects, and/or wetting effects.

21. The tank arrangement according to claim 1, in combination with said liquid which is a cryogenic liquid being liquid hydrogen or liquid oxygen.

22. The tank arrangement according to claim 1, in combination with said liquid which is a storable liquid fuel being monomethylhydrazine (MMH) or hydrazine ($N_2H_4$).

23. The tank arrangement according to claim 1, in combination with said liquid which is a liquid oxidizer being dinitrogentetroxide ($N_2O_4$).

24. A tank arrangement for a spacecraft comprising:
- a tank enclosing a tank interior space adapted to contain therein a liquid for operation of the spacecraft and a pressurized driving gas adapted to drive the liquid out of said tank; and
- a gas supply and extraction device that is arranged in said tank interior space and is adapted to separate the gas from the liquid and extract the gas out of said tank, and that comprises:
- a housing shell enclosing therein an interior reservoir space,
- a plurality of passage bodies that are arranged on a perimeter of said housing shell and provide respective open passages communicating through said passage bodies from said tank interior space to said interior reservoir space, wherein said open passages are enlarged with an increasing cross-sectional area toward said tank interior space,
- a respective plurality of plates respectively arranged in each respective one of said passage bodies, wherein said plates protrude into said open passage of said respective passage body alternately in succession from opposite sides of an inner surface of said respective passage body,
- a plurality of elongated plates arranged on an inner surface of said housing shell and extending longitudinally parallel to a longitudinal axis of said housing shell,
- a gas extraction conduit leading and communicating from said interior reservoir space out of said device and out of said tank,
- plural baffle plates, with a respective one of said baffle plates respectively arranged in front of a respective open end of each respective one of said passage bodies in said tank interior space, and with a respective gap formed between said respective baffle plate and said open end of said respective passage body, and
- double screen arrangements respectively interposed in said open passages between said interior reservoir space and said plates in said passage bodies.

* * * * *